INVENTOR
FRANK ALLEN STALLWORTHY
BERNARD DRAKE

BY Larson and Taylor

INVENTOR

FRANK ALLEN STALLWORTHY
BERNARD DRAKE

BY Larson and Taylor

Jan. 8, 1963 F. A. STALLWORTHY ETAL 3,072,747

PULSE SIGNALLING SYSTEMS

Filed May 14, 1959 3 Sheets-Sheet 3

INVENTOR

FRANK ALLEN STALLWORTHY
BERNARD DRAKE

BY Larson and Taylor 3,072,747
PULSE SIGNALLING SYSTEMS

Frank Allen Stallworthy, Bexleyheath, and Bernard Drake, Blackheath, London, England, assignors to Associated Electrical Industries (Woolwich) Limited, a British company Filed May 14, 1959, Ser. No. 813,090
Claims priority, application Great Britain May 27, 1958
14 Claims. (Cl. 179—15)

This invention relates to pulse signalling systems of the kind in which digital or other information is transmitted in the form of pulses each comprising a combination of two or more frequencies selected from a plurality of available frequencies in accordance with the information to be conveyed: for example, the value of a decimal digit may be transmitted by means of a single pulse comprising a unique combination of two frequencies chosen from an available group of five frequencies in accordance with a so-called two-out-of-five code. Such signalling systems, for which the frequencies employed are commonly within the voice frequency range but may be in other ranges, will for convenience hereinafter be called multiple-frequency pulse signalling systems, it being appreciated that the multiple frequencies are those constituting the pulses and do not refer to the pulse repetition rate.

In certain telephone systems for example, multiple-frequency pulse signalling systems using voice frequencies are sometimes employed for transmitting over a voice-frequency transmission path to a remote register, during the process of setting up a telephone connection, digital information which relates for instance to the number of a called or calling party or to a route between switching centres involved in the connection. Thus when a trunk connection or other voice-frequency transmission path has been established to a register at a remote location and this fact has been signalled by, say, some form of line signalling equipment, then a manually operated keyset or an automatic alternative-route sender may bring about, as in an already known telephone system employing multiple-frequency signalling, the transmission of digital signals each in the form of a pulse comprising a combination of voice frequencies according to a particular code. Although the invention is not limited as regards the number of frequencies constituting a signal, the code just mentioned may with advantage be one in which a unique combination of two out of a group of, say, five or six available frequencies, is allocated to each digital signal; such a code has the advantage of permitting relatively simple error checking by virtue of the fact that for each signal two frequency-responsive detectors, neither more nor less, should respond.

In the known system mentioned, the sources which provide the frequencies constituting a particular signal are applied in series to the transmission path so that it is normally impossible for a single frequency to be transmitted (wrongly) alone. A receiver at the register location includes a common limiting amplifier feeding a number of frequency detectors, of which there is one tuned to each of the signalling frequencies, and also includes what will be called a broad-band detector responsive to any of these frequencies and therefore to the receipt of any signal irrespective of its frequency. Each frequency detector comprises a narrow band-pass filter, a rectifying and smoothing circuit, and a relay which is actuable from its normal, unoperated condition to its operated condition on detection of the frequency to which the detector is tuned. The broad-band detector is similar except that it has a broad band-pass filter to respond to all frequencies and includes a delay element which delays the response of its relay: this relay of the broad-band detector controls the connection of an energy supply for the relays of the frequency detectors, thus preventing any of these latter relays from operating until after the delayed operation of the broad-band detector relay. The delay feature is employed because, on account of the series method of applying the signal frequencies and with a view to economy in the key-set equipment, no limiting filters are employed at the transmitting end and side-band energy of an applied frequency is therefore likely to spread over adjacent frequencies. There is therefore the possibility of transients generated at the beginning of a signal pulse being passed by the filters of frequency detectors which should not respond to the signal, the worst condition occurring when two frequencies making up a signal and received at maximum level (being affected to a minimum extent by trunk attenuation) are both close to an intermediate frequency and arrive one after the other due to delay distortion in the trunk. The delay feature referred to is provided to ensure that any such transients will have decayed sufficiently for these unwanted frequency detectors not to respond thereto. Because of this delay, however, a short duration signal pulse might be so foreshortened as to be incapable of operating the register. The frequency detectors or their relays are therefore arranged to "lock," following response to the pertinent frequency, and an effective lengthening of the signal as applied to the register is thereby obtained. The locked detectors or relays are subsequently "unlocked" in response, for instance, to release of the broad-band detector relay, the signal to the register being thereby terminated.

Also in this known system the limiting action of the common amplifier tends to provide, in response to a received signal, inter-modulation products some components of which pass into, and tend to operate, frequency detectors which should not respond. Since the proportion of these interfering products is dependent upon the received signal level, a separate non-limiting amplifier is included which injects a compensatory bias into all of the frequency detectors. The receiver also includes a check circuit which certifies that only two of the frequency detectors has responded for each signal pulse received: should more than two of these detectors respond for any reason, for instance as a result of two keys of the keyset being wrongly depressed simultaneously, an error detecting relay operates and reverts to the transmitting end, again over line signalling equipment for example, a signal which invites the operator to release the call and start again.

Although, as has been shown, the known system described can include provisions which minimize the possibility of erroneous operation from certain causes, this known system is still liable to interference during signal reception due to transmission irregularities. For instance "clicks" or other short bursts of circuit noise of relatively high amplitude could interfere with reception. Because of the "locking" feature with which the frequency detectors are provided, the danger of such interference is present during such times as the relay of the broad-band detector is in its operated condition and the frequency detectors are therefore in a condition to respond. Since the two frequency components of a received signal will be at about the same amplitude level, they will beat together so that intervals of high volume alternate with intervals of low volume. During each low volume interval the common amplifier will not be limiting and will allow the passage of "clicks" which, if of sufficient energy as they appear at the output of the amplifier, may cause one or more unwanted frequency detectors to respond and lock, thus establishing an error condition. Danger of erroneous operation also arises if a transient interruption in transmission divides a received signal pulse into two portions between which is a time gap which is not sufficiently long to permit the relay of the broad-band detector to be released. Consequently the frequency detectors remain responsive and transients generated at the beginning of the second portion of the divided signal in the filter of a frequency detector which should not respond may in fact result in that detector responding and an error condition being thereby established.

The establishment of an error condition virtually results in the rejection of the tank connection, but such rejection may be unnecessary in the case of transmission irregularities such as those just mentioned since the connection may still be serviceable in spite of them. It would therefore be wasteful to reject the connection and in some circumstances, for example during a thunderstorm, congestion might result due to over-sensitivity to impulsive noise and transient transmission interruptions. Furthermore, rejections due to imperfections of a system are irritating to those using it.

Another drawback of the known system being considered is that the speed of signalling, that is, the pulse transmission rate, may have to be reduced to allow for the effects of echo experienced on a trunk connection. Such echo may leave a low level signal at the receiving end for a short period after a directly propagated pulse has ceased and if this low level signal is nevertheless above the sensitivity of the detectors, a lengthening of the pulses as passed on to the register will occur, with a consequent reduction in the interval between successive pulses. Since this interval has to be long enough for the register, having stored the information in one pulse, to become prepared to store the information in the next pulse, the transmission rate may have to be slowed down. This would again be wasteful of holding time.

It is an object of the invention to provide for a multiple-frequency pulse signalling system an improved receiver which avoids, or can readily be designed to avoid, the aforementioned disadvantages of the known system.

According to the invention, such receiver includes, in respect of each combination of two or more frequencies constituting a signal, a frequency detector comprising an acceptor circuit tuned to respond to one of the frequencies of the relevant combination, and a rejector, or guard, circuit responsive to all of the signal frequencies of the system and effective, on so responding to a frequency other than that to which the acceptor circuit is tuned, to render the acceptor circuit ineffectual, which rejector circuit of each detector is preceded by a band-stop filter circuit designed to attenuate each other signal frequency of the combination to which the detector relates to an extent to prevent effective response of the rejector circuit thereto: thus for a system employing signal combinations of only two frequencies, the band-stop filter circuit preceding the rejector circuit of any particular detector would include a filter designed to attenuate one of the two signal frequencies of the combination to which the detector relates, the acceptor circuit being tuned to the other signal frequency of the combination.

In this receiver according to the invention, each frequency detector is selective, in conjunction with the filter preceding its rejector circuit, to its own combination of signal frequencies and rejects any other combination because one or more of the component frequencies of such other combination will pass through the filter circuit, not being within its stopband, and will cause response of the rejector or guard circuit to render the acceptor circuit ineffectual. Moreover, incorrect operation as a result of the component frequencies of a signal being received with different amplitude levels due to attenuation distortion in a trunk connection, can be effectively avoided by designing the rejector circuit of each detector with a high rejection, or guard, coefficient at all signal frequencies other than those of the signal to which the detector relates, and by ensuring that the rejector circuit is fully ineffectual for the frequency or frequencies attenuated by the preceding band-stop filter circuit; these requirements imply that the filter circuit should be designed to have a sufficiently high attenuation within its stop-band to render the frequencies within that band ineffectual, while at the same time preferably introducing only a minimum loss in respect of the frequencies to which the rejector circuit has to respond. In this way the need for a preceding limiting amplifier can be removed and each detector can include its own (non-limiting) amplifier. Since this amplifier would have to deal with only one frequency (namely that to which the acceptor circuit responds), no provision would then have to be made to combat intermodulation effects.

Furthermore, transient false operation of those detectors which should not respond to a particular received signal can readily be avoided by arranging that the response of each rejector circuit takes effect more quickly, and loses effect more slowly, than does the response of its associated acceptor circuit. The resultant covering action of the rejector circuits also reduces the ill-effects of pulse lengthening due to echo. At the beginning and end of a signal pulse, the frequency component which is attenuated by the band-stop filter circuit of a detector tends to initiate a transient which reaches the rejector circuit of that same detector and could cause some fore-shortening of the signal (as applied by the acceptor circuit to, say, an associated register) due to the acceptor circuit being rendered ineffectual by the rejector circuit during the period of such transient. This signal distortion, however, would be substantially constant and can readily be compensated for in the acceptor circuit without requiring the introduction of a "locking" action and the previously indicated dangers of erroneous operation consequent thereon. A transient transmission interruption would at worst cause restoration of any acceptor circuits that had responded to the first part of an interrupted signal. The resultant un-responded conditions of the acceptor circuits, being also their quiescent state, do not constitute an error condition on which a trunk connection taken into use would be rejected: in fact there would be no false operation of an associated register if the duration of the interruption was less than the normal response lag of the register equipment following termination of an uninterrupted signal pulse.

Since in any frequency detector its acceptor circuit would be rendered ineffectual on receipt by the detector of a signal composed of a greater number of signal frequencies than the combination to which it relates, there may be provided at the receiver, for the detection of double keying or other errors resulting in the receipt of such greater number of frequencies, a broad-band detector which is responsive to the presence of any signal, irrespective of the number of frequencies it contains, and would preferably comprise acceptor and rejector circuits as in the frequency detectors but without any band-stop filter: such acceptor and rejector circuits in the broad-band detector can be designed to give the required broad pass-band covering the whole range of the signal frequencies without requiring a separate band-pass filter. Response of this broad-band detector, unaccompanied by response of any of the frequency detectors in consequence of the receipt of a signal containing too many frequencies, establishes an error condition which can be signalled back to the transmitting end as before.

To permit the detection and signalling of the existence of a condition which has resulted in receipt of only a single frequency (instead of a combination of two or more), it is contemplated that the frequency code chosen and the allocation of tuning frequencies for the acceptor circuits of the frequency detectors would be such that, in respect of each frequency, at least two of these detectors or none of them, have their acceptor circuits tuned to it. Since the receipt of a single frequency would then cause more than one of these detectors to become effectual, because their rejector circuits would not respond to such frequency, or would cause none of them to become effectual, an error condition is thereby established because as has already been stated only one of the frequency detectors should become effective.

It is also contemplated that, dependent on the coding used, the frequency detectors could be divided into groups in each of which there is a common frequency (or frequencies) in the frequency combinations to which the detectors in the group are respectively allocated. A common band-stop filter circuit for attenuating the common frequency (or frequencies) could then be provided for the detectors in each group, thus reducing the number of filters required.

In order that the invention may be more fully understood a particular embodiment thereof constituted by a receiver which employs common band-stop filter circuits feeding respective groups of frequency detectors as just indicated, will now be described by way of example with reference to the accompanying drawings in which.

For the embodiment now to be described, it will be assumed that there is a total of twelve possible dual-frequency signals, namely ten signals each representing a different decimal digit value and two control signals. For transmitting these signals, six signal frequencies F1 . . . F6 are employed, combined in pairs to constitute the twelve signals required, and the receiver includes a corresponding number of frequency detectors D1 . . . D12 (FIG. 1) to which the frequency pairs are allocated, one to each. In order to permit the use of common filters as stated, while at the same time permitting detection of an erroneous single frequency signal, the frequency pairs may be allocated and coded in the manner shown in Table 1.

*Table 1*

| Detector | Signal Frequencies | Code | | | | | |
|---|---|---|---|---|---|---|---|
| | | F1 | F2 | F3 | F4 | F5 | F6 |
| D1 | F1+F2 | x | x | | | | |
| D2 | F1+F3 | x | | x | | | |
| D3 | F2+F3 | | x | x | | | |
| D4 | F1+F4 | x | | | x | | |
| D5 | F2+F4 | | x | | x | | |
| D6 | F3+F4 | | | x | x | | |
| D7 | F1+F5 | x | | | | x | |
| D8 | F2+F5 | | x | | | x | |
| D9 | F3+F5 | | | x | | x | |
| D10 | F4+F5 | | | | x | x | |
| D11 | F3+F6 | | | x | | | x |
| D12 | F5+F6 | | | | | x | x |

The signal frequencies F1 . . . F6 may for instance be 700, 900, 1100, 1300, 1500 and 1700 cycles per second respectively, these frequencies all being within the audio frequency range. It will be noticed that only five (F1 . . . 15) of the six frequencies are involved, in pairs, in the allocations to the first ten detectors; these ten frequency pairs could represent the ten possible digit values to be signalled, doing so in two-out-of-five code.

Figure 1:
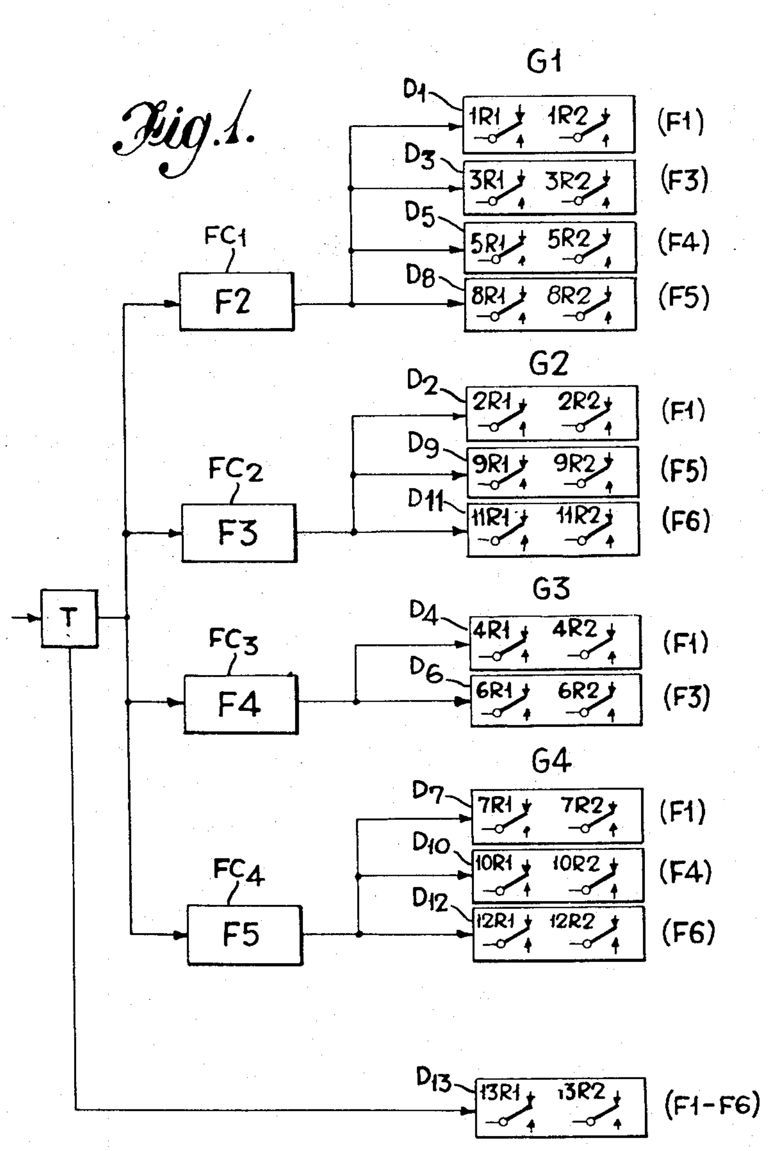
FIG. 1 is a block diagram showing the grouping of the detectors in relation to the band-stop filters of this receiver.

Referring now to FIG. 1, the twelve frequency detectors provided in the receiver are represented by the twelve rectangles D1 . . . D12: as will be described in detail later with reference to FIG. 2, each of these twelve detectors includes an acceptor circuit and a rejector, or guard, circuit as previously stated. The acceptor circuit of each detector is tuned to respond to one of the two signal frequencies constituting the signal allocated to the detector; for instance the acceptor circuit of detector D1 is tuned to frequency F1 as indicated in brackets alongside the relevant rectangle in FIG. 1. The rejector circuit of each detector is tuned to respond to all of the signal frequencies F1 . . . F6 and is effective, on responding to a signal frequency other than the one to which the acceptor circuit of the detector is tuned, to render this acceptor circuit ineffectual. The receiver also includes a broad-band detector, represented by the rectangle D13, which also includes an acceptor circuit and a rejector or guard circuit, but unlike the frequency detectors D1 . . . D12 is designed to respond to any received signal no matter by what signal frequency, or frequencies, it is constituted.

The twelve frequency detectors D1 . . . D12 are arranged in four groups G1 . . . G4 which are preceded by respective band-pass filters represented by four further rectangles FC1 . . . FC4. Received signals applied to an input circuit T for the receiver are fed to the frequency detectors D1 . . . D12 by way of these filter circuits FC1 . . . FC4, and are also fed directly to the broad-band detector D13 which has no intervening filter circuit between it and the input circuit T. Each detector D1 . . . D13 includes contacts which it actuates when it responds to a received signal, each detector having been indicated in FIG. 1 as having two such contacts designated R1 and R2 with a numerical prefix according to the particular detector concerned.

In carrying out the invention, each of the individual frequency detectors may include a sharply tuned circuit constituting its acceptor circuit and tuned to one of the frequencies of the combination to which the detector is to respond, and a broadly tuned circuit constituting its rejector, or guard, circuit, these two circuits being preceded by the band-stop filter tuned to the other frequency of the combination and the outputs from the two circuits being combined in such manner that on receipt only of the frequency to which the acceptor circuit is tuned the output of this latter circuit overrides that of the rejector circuit and brings about the actuation of the contacts such as R1, R2 controlled by the detector, whereas on the receipt of any other frequency or frequencies passed by the band-stop filter, the output of the rejector circuit over-rides that of the acceptor circuit and no actuation of the controlled contacts takes place. By way of example, such a detector is typified, at D, in the upper part of FIG. 2, which also shows an exemplary band-stop filter circuit FC typifying the filters FC1 . . . FC4, a suitable circuit for the broad-band detector D13, and a suitable form for the input circuit T.

Figure 2:
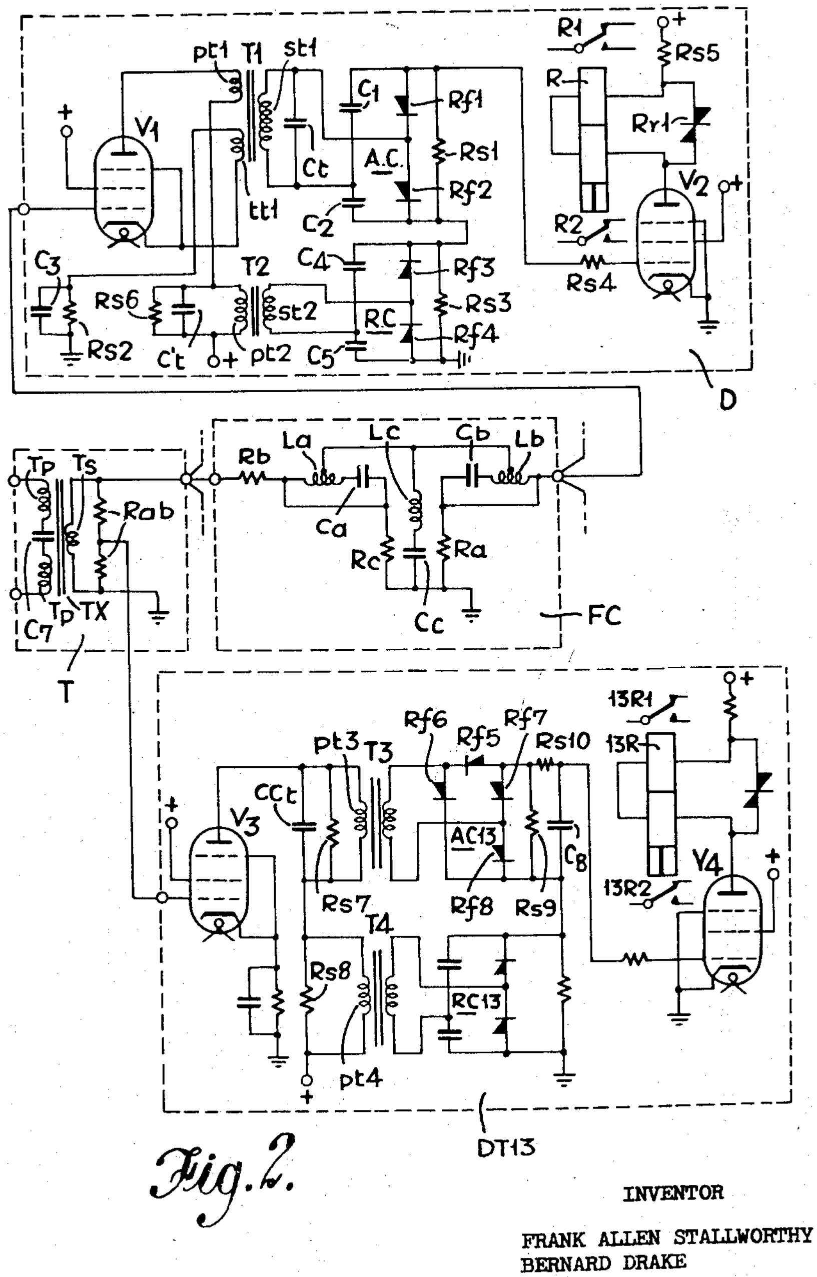
FIG. 2 shows suitable circuits, with interconnections therebetween, for a typical frequency detector and preceding band-stop filter as employed in the receiver, and also for the broad-band detector employed therein.

Referring to FIG. 2, the input circuit T includes an input transformer TX having its secondary winding $T_s$ connected on the one hand to the broad-band detector D13 and on the other hand to the filter circuits such as the filter circuit FC of the frequency detectors. The primary winding $T_p$ of the input transformer TX is in two serially connected parts with an intervening capacitor C7 the capacitance of which, together with the turns ratio of the transformer TX, are chosen to give a desired input impedance minimising echo during signalling.

The typical frequency detector D comprises at its input a voice-frequency amplifying valve V1, suitably of a high gain pentode type. The anode circuit of the valve V1 includes, in series, the primary winding *pt1* of a coupling transformer T1 which feeds the acceptor circuit AC of the detector D, and the primary winding *pt2* of a coupling transformer T2 which feeds the rejector circuit RC of the detector D. In the acceptor circuit AC the secondary winding *st1* of the transformer T1 is tuned to a desired acceptance frequency by a capacitor $C_t$ and is connected to a voltage doubling rectifier circuit constituted by capacitors C1, C2, rectifiers R*f*1, R*f*2 and resistor R*s*1. The coupling transformer T1 also has a tertiary winding *tt*1 which is connected in the cathode circuit of the valve V1 in such manner as to produce negative feedback in the neighbourhood of the acceptance frequency of the acceptor circuit AC. This feedback has the effect of flattening the otherwise peaked response of the acceptor circuit AC so that the rise time of a signal pulse received by the detector D, as it appears in the secondary winding *st*1 of the coupling transformer T1, is effectively reduced and thereby helps to reduce pulse distortion. The necessary grid bias for the valve V1 is provided by resistor R*s*2 in its cathode circuit, this resistor R*s*2 being shunted by a capacitor C3. In the rejector circuit RC, the primary winding *pt*2 of the coupling transformer T2 is broadly tuned by a capacitor $C'_t$ shunting it, and the secondary winding *st*2 of the transformer T2 is connected to another voltage doubling rectifier circuit constituted by capacitors C4, C5, rectifiers R*f*3, R*f*4, and resistor R*s*3. The two voltage-doubling rectifier circuits are connected in effective series opposition with each other in the control grid circuit, including resistor R*s*4, of a normally conducting output valve V2 which is also suitably of the pentode type. The anode circuit of the valve V2 includes a high-speed detector relay R having two serially connected windings connected in the anode circuit in series with a current limiting resistor R*s*5. On receipt by the detector D of only the frequency to which its acceptor circuit AC is tuned, the rectified output voltage of this latter circuit over-rides that of the rejector circuit RC and cuts off the valve V2, but if the detector D also receives another frequency passed by the filter circuit FC, the rejector circuit overrides the acceptor circuit and prevents cut-off of the valve V2. The rejection (guard) coefficient, which is a function of the relative magnitude of the output of the rejector circuit RC, is predetermined by a selected value of a damping resistor R*s*6 connected across the primary winding *pt*2 of the rejector circuit coupling transformer T2.

The values of the components constituting the two voltage-doubling rectifier circuits in the frequency detector D are chosen so that for a signal pulse comprising an unwanted combination of frequencies including that to which the acceptor circuit AC is tuned, the output of the rejector circuit RC rises more rapidly, and decays more slowly, than that of the acceptor circuit, thereby giving a covering action for the purpose explained earlier. This, however, taken in conjunction with the pulse characteristics of the preceding filter typified by FC, tends to cause fore-shortening of the pulse in the output valve V2, especially at low signal levels. With the output valve V2 normally conductive, so that the relay R is therefore normally operated and is released when the valve V2 is cut-off when the acceptor circuit output takes control, this fore-shortening can be counteracted, without requiring a "locking" action, by arranging the relay R to have a longer operating lag than release lag. To this latter end, to achieve optimum compensation, the value of the limiting resistor R*s*5 in the output valve anode circuit is chosen to limit the quiescent relay current to the minimum required for reliably operating the relay. The release time of the relay R is therefore reduced and this compensates for the pulse fore-shortening. In the case of signals received at relatively high level, the more rapid cut-off of the output valve V2 may tend to cause what might be considered as a fore-lengthening of the pulse: to counteract this, the relay may be shunted by a non-linear resistor R*r*1 of the varistor type which, by virtue of the relatively high voltage surge generated in the relay winding on cut-off of the current in response to a high level signal, produces a short-circuiting effect on the relay winding and thereby delays its release to counteract the fore-lengthening of the pulse.

The filter circuit FC is of T-form comprising two series arms, each comprising a choke coil L*a*, L*b* and shunt capacitor C*a*, C*b*, and a shunt arm comprising a choke coil L*c* and series capacitor C*c*, the filter being terminated by an appropriate resistor R*a*. The coil of each series arm is tapped as an auto-transformer to permit standardisation of the associated capacitors C*a* and C*b*. The non-uniform impedance characteristics of the several filters are isolated from each other and from the input circuit by means of resistance pads of P*i* configuration formed by resistors R*ab*, R*b* and R*c*. The input shunt arm R*ab*, which in fact is common to all the filter circuits, is connected across the input transformer T and tapped to provide an attenuated input to the broad-band detector D13. By virtue of the resistance pad the impedance facing the secondary winding T*s* of the input transformer TX can be made substantially resistive throughout the whole frequency range.

The broad-band detector D13 is generally similar to the detector D in that it comprises a voice-frequency input amplifying valve V3, having the primary winding *pt*3 of an acceptor circuit coupling transformer T3 and the primary winding *pt*4 of a rejector circuit coupling transformer T4 connected in series in its anode circuit, an acceptor circuit AC13, a circuit RC13 corresponding to the rejector circuit RC of detector D, and an output valve V4 in the anode circuit of which is connected the detector relay 13R. However, for the broad-band detector 13D the acceptor circuit coupling transformer T3 has no tertiary feedback winding and is broadly tuned by a tuning capacitor $CC_t$ shunted across its primary winding *pt*3 in parallel with a damping resistor R*s*7. Moreover the primary winding *pt*4 of the rejector circuit coupling transformer T4 is shunted by a damping resistor R*s*8 giving relatively high damping and thus a relatively flat response of the circuit RC13: the combination of the acceptor circuit AC13 and the circuit RC13 in this instance provides a broad pass-band effect covering the required range over which the receiver is required to work. The presence of the damping resistor R*s*8 also gives the broad-band detector D13 a lower guard ratio than any of the frequency detectors D1 . . . D12 typified by detector D, with the result that the response of the relay R of one of these other detectors is covered in time by that of the relay 13R in the broad-band detector D13 under all combinations of variables and the introduction of additional variants into the signal distortion is thereby avoided. Another difference between the broad-band detector D13 and the frequency detectors such as D is that the voltage-doubler and rectifying circuit of the acceptor circuit AC in the latter is replaced in the acceptor circuit AC13 by a rectifier circuit constituted by rectifiers R*f*5–R*f*8, without a reservoir capacitor, followed by an R–C smoothing network constituted by resistors R*s*9 and R*s*10 and capacitor C8. In this way the broad-band detector D13, which has to handle a compound frequency signal beating at various different frequencies, can be arranged to perform very similarly, as regards level and timing, to the acceptor and rejector circuits of the frequency detectors, which have each only to deal with a single frequency: disparity in timing between the response of the relay R13 of the broad-band detector and that of the relay R of another detector, following receipt of a proper signal, can therefore be kept small.

Reverting now to FIG. 1, the grouping of the frequency detectors D1 . . . D12 is such that the dual-frequency signals to which the detectors in each group are respectively allocated are constituted by a common frequency in combination with the various frequencies to which the acceptor circuits of the respective detectors are tuned, the filter circuit preceding each group being designed to block that common frequency. Moreover to facilitate error detection, each frequency has either more or less than one acceptor circuit tuned to it, that is, at least two acceptor circuits, or none of them, are tuned to each frequency. This grouping of the detectors D1 . . . D12 is shown in Table 2.

*Table 2*

| Group | Detectors | Band-stop Filter freq. | Acceptor cct. frequency |
|---|---|---|---|
| G1 | D1<br>D3<br>D5<br>D8 | F2 | F1<br>F3<br>F4<br>F5 |
| G2 | D2<br>D9<br>D11 | F3 | F1<br>F5<br>F6 |
| G3 | D4<br>D6 | F4 | F1<br>F3 |
| G4 | D7<br>D10<br>D12 | F5 | F1<br>F4<br>F6 |

Thus on receipt, for example, of the signal which should be detected by response of detector D3, namely the signal constituted by the signal frequencies F2 and F3 (Table 1), the acceptor circuits in both the detectors D3 and D6 could respond to the F3 frequency but only that in the detector D3 would actually do so because the filter circuit FC1 blocks the F2 frequency from this detector, so that its rejector circuit is ineffectual to prevent response of its acceptor circuit, whereas the F2 frequency is passed by the filter circuit FC3 to the detector D6 and the rejector circuit in this latter detector therefore functions to render its acceptor circuit ineffectual. Similarly, if the signal (*F*1+*F*5) to which detector D7 is allocated is received, the acceptor circuits in the detectors D1, D2, D4 and D7 could respond to the F1 frequency component of this signal but only the acceptor circuit in the detector D7 will actually do so because the other, F5, frequency component of this signal is blocked only by the filter circuit FC4.

It will be observed from Table 2 that no signal frequency appears only once as a frequency to which the acceptor circuits of the frequency detectors D1 . . . D12 are tuned: F3, F4, F5 and F6 appear twice, F1 appears four times, and F2 does not appear at all. Hence, it is evident that, in contrast to the response of only a single frequency detector on receipt of a proper signal, the receipt of a false signal constituted only by a single frequency will result in response of more than one of the frequency detectors (or none of them in the case of frequency F2) since there is no other frequency component and the rejector circuits therefore cannot be effective. On the other hand, if a signal containing more than two signal frequencies is received, the acceptor circuits of all the frequency detectors are rendered ineffectual because in this circumstance each of the filter circuits will pass, to the rejector circuits in the associated group of detectors, at least one frequency other than that to which the detector acceptor circuits are tuned. Since in each instance the broad-band detector D13 will respond, an error condition is indicated either by the response of the broad-band detector in conjunction with the response of more than one (or none) of the frequency detectors in the case of a single frequency signal, or by the response of the broad-band detector alone in the case of a signal containing more than two signal frequencies.

Figures 3, 4:
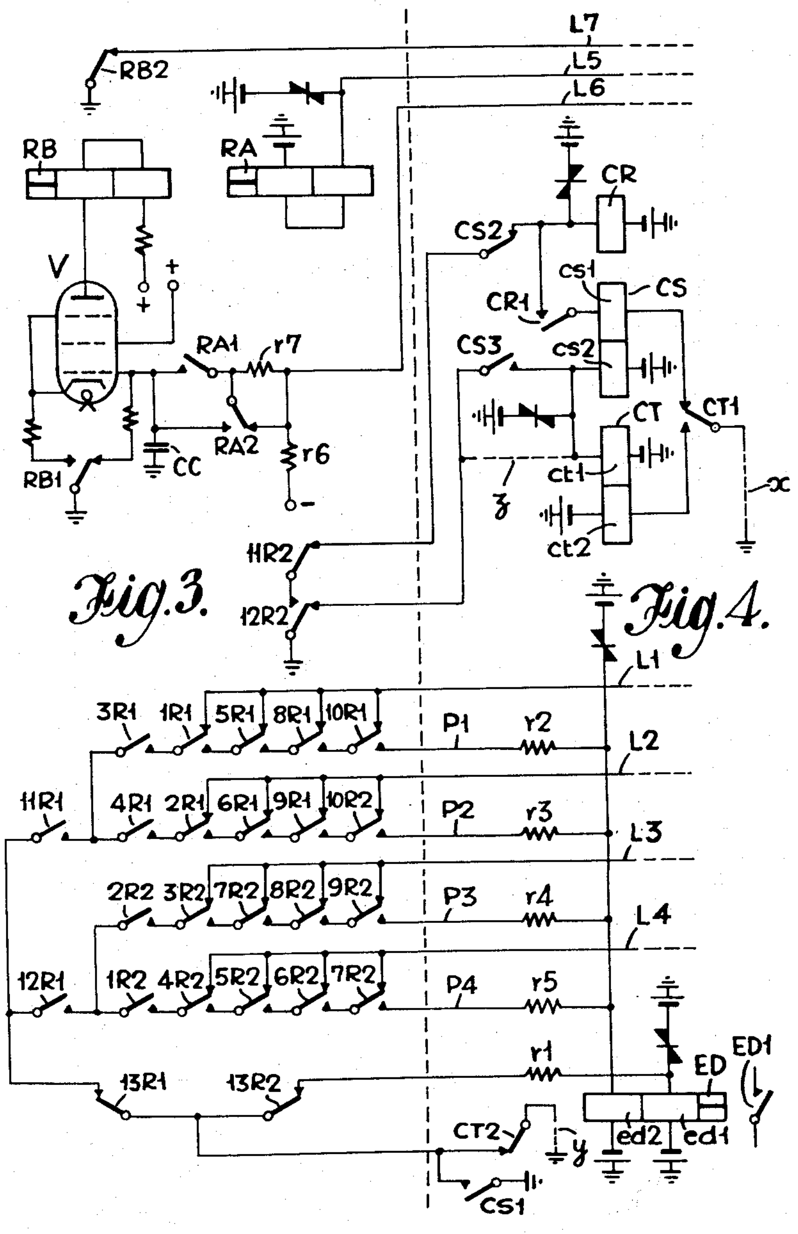
FIG. 3 shows the interconnection, for error detecting purposes, of contacts controlled by the detectors, together with an alarm circuit for the receiver.
FIG. 4 shows elements of an error detecting and control circuit associated with the receiver and assumed, for instance, to be included in a register with which the receiver will be employed.

To detect such error condition, there can be provided an error-detecting circuit including a relay ED (FIG. 4) having an operating winding, *ed*2, connected in an energising circuit in which contacts controlled by all the detectors D1 . . . D13 are interconnected (FIG. 3) in such manner as to establish an operating condition for this relay if the broad-band detector D13 and more or less than one of the frequency detectors D1 . . . D12 respond to a received signal, but not if the broad-band detector and a single one of the frequency detectors so respond. Referring now to FIGS. 3 and 4 together, it has been assumed, in line with FIG. 2, that in the operative condition of the receiver the detectors D1 . . . D13 normally hold their contacts 1R1, 1R2 . . . 13R1, 13R2 operated, and that on response of a detector to a received signal it releases its contacts to an unoperated position which is the position in which these contacts have been shown in FIG. 3. As shown in FIG. 4, the error-detecting relay ED preferably has two differentially connected operating windings *ed*1 and *ed*2. An energising circuit for the winding *ed*1 is established on receipt of any signal by the contact 13R2 controlled by the broad-band detector D13, this circuit following the path, negative battery, winding *ed*1, resistor *r*1, contact 13R2 (unoperated), contact CS1 (operated), to earth return: the contact CS1 is controlled by a control relay CS which will be referred to later. Also, an energising circuit for the other winding *ed*2 of the error-detecting relay ED is prepared by the other contact 13R1 controlled by the broad-band detector D13, this latter energising circuit including four parallel paths, P1, P2, P3 and P4, having respective resistors *r*2–*r*5 connected in series, in the manner shown, with certain of the contacts 1R1, 1R2 . . . 12R1, 12R2 in their operated positions. The contacts included in each of these paths are so chosen that, as will be seen from an examination of FIG. 3, the energising circuit for relay winding *ed*2 is established through two of the paths if any one of the frequency detectors D1 . . . D12 controlling these contacts responds to a received signal, whereas that energising circuit is established through more or less than two paths, or is not established at all, in consequence of an error condition in which the broad-band detector D13 responds and more than one, or none, of the frequency detectors D1 . . . D12 also responds. The resistance values of the resistors *r*2–*r*5 are so chosen that if the energising circuit for winding *ed*2 is established through two paths the energisations of the two windings *ed*1 and *d*2 are balanced and the error-detecting relay ED does not operate, but that if the energising circuit for winding *ed*2 is established through more or less than two paths or not at all, the relay ED is unbalanced and operates to indicate, as by closure of contacts ED1, the error condition then existing.

Since each combination of frequencies correctly constituting a signal is responded to by the acceptor circuit of only one of the frequency detectors, digit values represented by the detected signals can readily be passed on to, say, a register, in a code which, irrespective of the particular code used for the frequency combinations constituting the signals as received, can be chosen to suit the requirements of the register. Thus if registration is to be effected in a one- or two-out-of-four code, digit values represented by the detected signals could be passed to the register in this latter code even although a two-out-of-five code may be used for the received signals: in the known system referred to earlier, in which one detector responds to each frequency and therefore two or more detectors respond to each properly received signal, two such different codes would not readily be compatible.

By way of specific example, a digit value represented by a properly received signal detected by the relevant detector of the receiver may be passed on to the register, over four leads L1, L2, L3 and L4 extending to it, by applying an earth marking potential to one or two of the four leads in accordance with said digit value in one- or two-out-of-four code. The application of this marking potential to the leads L1 . . . L4 by the frequency detectors D1 . . . D12 is conveniently effected as shown in FIG. 3 by means of the same contacts, in their unoperated positions, as are used for controlling the error-detecting relay ED, namely the contacts 1R1, 1R2 . . . 12R1, 12R2. Thus examination of FIG. 3 will reveal that the arrangement of the contacts 1R1, 1R2 . . . 12R1, 12R2 is such that operation of any one of the frequency detectors D1 . . . D12 to a received signal, assuming that the broad-band detector D13 also operates, results in the marking of the register leads L1 . . . L4 according to the second column of Table 3 below, and in the establishment of connections through the parallel paths P1 . . . P4 according to the third column.

*Table 3*

| Detector Operated | Register leads marked | | | | Path connections established | | | |
|---|---|---|---|---|---|---|---|---|
| | L1 | L2 | L3 | L4 | P1 | P2 | P3 | P4 |
| D1 | x | | | | | x | x | |
| D2 | | x | | | x | | | x |
| D3 | | | x | | | x | | x |
| D4 | | | | x | x | | x | |
| D5 | x | | | x | | x | x | |
| D6 | | x | | x | x | | x | |
| D7 | | | x | x | x | x | | |
| D8 | x | | x | | | x | | x |
| D9 | | x | x | | x | | | x |
| D10 | x | x | | | | | x | x |
| D11 | | | | | | | x | x |
| D12 | | | | | x | x | | |

Where the receiver is to be employed with a register which may receive digits either as multiple-frequency signals or as dial pulses, an initial multiple-frequency control signal may be sent, after seizure of the register, to cause the operation of control relays CR, CS and CT in the error-detecting and control circuit, of FIG. 4 and thereby prepare the register for the receipt of digit signals in multiple-frequency code. This initial control signal, assumed to be compounded of the signal frequencies F3 and F6, is responded to jointly by the broad-band detector D13 and the frequency detector D11, which latter detector thereupon completes an energising circuit for the relay CR over the path: negative battery, operating winding of relay CR, contact CS2 unoperated, contact 11R2 unoperated, contact 12R2 operated, to earth. By means of contacts not shown, the relay CR, on operation, prepares the register circuits for multiple frequency reception rather than dial pulse reception, and also prepares, over its now operated contact CR1, an energising circuit for a first operating winding *cs*1 of the control relay CS, which, however, does not operate until the termination of the initial control signal due to the presence of earth potential at both sides of the winding *cs*1, namely the earth behind contact 12R2 (operated) and the earth behind contact CT1 of the control relay CT: this latter earth is extended from the register, after seizure thereof, over a connection represented by the dotted lines *x*. At the termination of the initial control signal, the earth behind the contact 12R2 is disconnected from winding *cs*1 by the re-opening (re-operation) of the contact 11R2 and an energising circuit for the relay CS is completed over the path: earth, the connection *x*, contact CT1 unoperated, the winding *cs*1, contact CR1 operated, the operating winding of relay CR, to negative battery: the relay CR is also maintained operated over this path.

After all the subsequent digit signals have been received and extended to the register over the leads L1. . .L4 in one- or two-out-of-four code, a second dual-frequency control signal, compounded of the signal frequencies F5 and F6, is applied to the receiver and is responded to by the frequency detector D12. This brings about operation of the control relay CT by completing for operating winding *ct*1 of this relay an energising circuit over the path: earth, contact 12R2 unoperated, contact CS3 operated, winding *ct*1, to negative battery. Contact CT1, now operated, establishes a holding circuit for the relay CT by switching to its other operating winding *ct*2 the earth extended over connection *x* but in doing so breaks the energising circuit for the relays CR and CS. In consequence relay CR releases, but relay CS has its second operating winding *cs*2 connected in parallel with the winding *ct*1 and therefore remains operated for the present. Termination of the second control signal brings about, by the re-operation of the contact 12R2, the disconnection of the hold circuit for the windings *cs*2 and *ct*1 of the control relays CS and CT: relay CS thereupon also releases but the control relay CT remains operated by virtue of the earth extended from the register over the connection *x*. Further contacts (not shown) of this relay CT may be employed to start or prepare sending apparatus which transmits the digital information then stored in the register, after which the earth is removed from connection *x* and relay CT releases.

Since the establishment of the energising circuits for the two windings *ed*1 and *ed*2 of the differential error-detecting relay ED are made dependent, in the seized condition of the receiver and register, on the prior operation of contact CS1 of the control relay CS, any operation of the broad-band detector D13, as a result, for instance, of the receipt of speech or noise currents prior to the receipt of the first control signal, would not result in operation of the error-detecting relay ED. Moreover, in the un-seized condition of the receiver and register, an earth may be extended from the register over a connection represented by the dotted line *y*, so that a normally-closed contact CT2 of the control relay CT then presents a short-circuit across the contact CS1. Consequently the connection of the detector-controlled contacts 1R1, 1R2. . .12R1, 12R2 in the manner already described, can also give the result that fortuitous operation, in the un-seized condition, of any one alone, or all together, of the frequency detectors D1. . .D10 and D13, that is, the detectors other than those, D11 and D12, which are allocated to the control signals, would result in an unbalanced energisation of and thus operation of, the error-detecting relay ED. In a manner not shown, it may be arranged that such operation of the error-detecting relay ED in the unseized condition brings about (by means of contacts not shown) an alarm condition in which the receiver and register are switched out of service and an alarm signal is given, while operation of the error-detecting relay ED in the seized condition may bring about the reversion of a re-order signal without initiating an alarm condition. Fortuitous operation of either of the control signal detectors D11 and D12 alone, may in the unseized condition cause an alarm signal to be given as a result of the consequent operation of one of the control relays CR and CT over energising circuits established respectively by the contacts 11R2 and 12R2, the energising circuit for the relay CT being in this instance completed in the register over a connection represented by the dotted lines *z*, which connection is broken after seizure of the register.

Should one or more of the frequency detectors D1. . .D12 become mal-operative without producing operation of the error-detecting relay ED and the giving of an alarm in the un-seized condition, then such operation of the relay ED will take place on receipt of signals representing digit values involving the mal-operative detector(s). If the fault causing this mal-operation persists, the proportion of unsuccessful calls accompanied by operation of the error-detecting relay ED and the return of a re-order signal will become excessive in relation to the total number of calls handled by the receiver. To give an alarm on the ocurrence of this condition, the receiver may include (FIG. 3) an alarm circuit including two alarm relays RA and RB, of which the relay RB is normally held operated in the anode circuit of a normally conductive valve V. The register is so arranged that, each time it is released after use, it applies an operating earth pulse of a short duration over a lead L5 to the relay RA, which at its contact RA1 connects a capacitor CC for the pulse duration to either a charging or a discharging potential according as to whether or not a re-order signal was returned on each release of the register. In the case of a release unaccompanied by a re-order signal, a lead L6 is earthed from the register and the capacitor CC tends to discharge, but in the case of a release accompanied by a re-order signal, the lead L6 is un-earthed and a negative potential applied through resistors $r6$ and $r7$, and contact RA1, charges the capacitor CC. Consequently, the resultant charge on the capacitor CC will depend on the proportion of unsuccessful calls accompanied by return of a re-order signal and when the capacitor charge reaches a predetermined level the grid of the valve V becomes sufficiently negative to stop conduction of the valve and thereby cause release of the relay RB. Upon its release, the relay RB locks the valve V non-conductive by means of its changeover contact RB1, and at its contact RB2 extends an alarm condition over the lead L7.

As indicated above, the broad-band detector D13 may operate to speech or noise currents, doing so because of its non-selective broad-band response. The frequency detectors D1. . .D12, on the other hand, are intrinsically noise-immune because of the action of their rejector circuits in rejecting any signals which, as would be the case with noise signals, are not of the appropriate frequency combination: they can also readily be designed to be immune to signal initiation by speech. Consequently signal reception will be less subject to noise interference and, moreover, the need for switching the receiver from a speech-immune condition to a signal-responsive condition, as is required in the known arrangement referred to earlier because its detectors are not intrinsically speech-immune, can be avoided.

What we claim is:

1. A multiple-frequency pulse signalling receiver including a plurality of frequency detectors, one for each normal combination of signal frequencies to which the receiver is required to respond, each such frequency detector comprising an acceptor circuit tuned to one of the frequencies of the relevant combination, and a rejector circuit capable of responding to all the signal frequencies and effective to render the acceptor circuit ineffectual to respond to any frequency other than that to which it is tuned, and band-stop filter means preceding the rejector circuit of each said frequency detector, said band-stop filter means which precedes the rejector circuit of any particular detector being tuned to effectively stop each signal frequency of the relevant combination other than that to which the acceptor circuit of the detector is tuned.

2. A receiver as claimed in claim 1, wherein the frequency detectors are divided into groups in each of which there is at least one common frequency in the different frequency combinations to which the detectors constituting the group relate, and wherein the band stop filter means preceding the rejector circuits of the detectors in each group comprises a common band-stop filter tuned to effectively stop said common frequency for the group.

3. A receiver as claimed in claim 1, wherein the rejector circuit of each detector has a high rejection coefficient for all signal frequencies other than those of the signal to which the acceptor circuit of the detector is tuned, and the band-stop filter means preceding the rejector circuit is designed to provide adequate stop-band attenuation while at the same time introducing a minimum of attenuation in respect of the frequencies outside its stop-band.

4. A receiver as claimed in claim 1, wherein, for each detector, the rejector circuit has a response which takes effect more quickly, and loses effect more slowly, than does the response of the acceptor circuit.

5. A receiver as claimed in claim 1, including also a broad-band detector connected and arranged to respond to the reception of any frequency signal, irrespective of the number of frequencies said signal contains.

6. A receiver as claimed in claim 5, including error detecting means for detecting the receipt of a false signal containing more frequencies than in a normal combination, error-detecting means operable in response to response of the broad-band detector unaccompanied by response of any of the frequency detectors.

7. A receiver as claimed in claim 5 wherein for detecting the receipt of a false signal containing only a single frequency, each signal frequency has at least two, or none, of the frequency detector acceptor circuits tuned to it, and there is included error-detecting means operable in response to response of the broad-band detector accompanied by response of more than one, or none, of the frequency detectors.

8. A receiver as claimed in claim 5, wherein for detecting the receipt of a false signal containing only a single frequency or more frequencies than in a normal combination, each signal frequency has at least two, or none, of the frequency detector acceptor circuits tuned to it and there is included error detecting means including a relay having an operating winding thereof connected in an energising circuit which includes contacts controlled by all the detectors, which contacts are interconnected to establish an operating condition for said relay when the broad-band detector responds to a received signal, accompanied by response of more or less than one of the frequency detectors.

9. A receiver as claimed in claim 8, wherein the error-detecting relay has two differentially connected operating windings for one of which an energising circuit is established by a contact controlled by the broad-band detector on receipt of any frequency signal, while another contact also controlled by the broad-band detector prepares for the other winding an energising circuit including a plurality of parallel paths each of which includes an impedance in series with contacts controlled by certain of the frequency detectors chosen such that the energising circuit for said other winding is established through a predetermined number of these paths if only one of the frequency detectors operates to a received signal, but is established through a greater or lesser number of the paths, or not at all, in consequence of an error condition in which none or more than one of the frequency detectors operates, the impedance values being so chosen that on establishment of this latter energising circuit through said predetermined number of paths the energisations of the two relay windings are balanced and the relay does not operate, but that if that energising circuit is established through a greater or lesser number of the paths, or not at all, the relay is unbalanced and operates to indicate the error condition then existing.

10. A receiver as claimed in claim 8 including control means rendered effective in consequence of one of the frequency detectors responding to a received frequency combination constituting a control signal, operation of the error-detecting relay being dependent, at least in a seized condition of the receiver, on prior operation of said control means.

11. A receiver as claimed in claim 10, wherein operation of the error-detecting relay is independent of prior operation of said control means in an un-seized condition of the receiver.

12. A receiver as claimed in claim 11 wherein the same contacts of the frequency detectors are employed for controlling the error-detecting relay are also employed for signalling in a predetermined code, digit values represented by received normal combinations of signal frequencies to which the detectors respectively respond.

13. A receiver as claimed in claim 1, including an input transformer having its primary winding in two serially connected parts with an intervening capacitor the capacitance of which, together with the turns ratio of the transformer, are chosen to give a desired input impedance minimising echo during signalling.

14. A multiple-frequency signal receiver including a frequency detector for each normal combination of signal frequencies to which the receiver is required to respond, each such frequency detector comprising an acceptor circuit tuned to one of the frequencies of the relevant combination and a rejector circuit capable of responding to all the signal frequencies and effective to render the acceptor circuit ineffectual to respond to any frequency other than that to which it is tuned, said frequency detectors being divided into groups in each of which there is at least one common frequency in the different frequency combinations to which the detectors constituting the group relate, band-stop filter means preceding the rejector circuits of the detectors in each group, said filter means comprising a common band-stop filter tuned to effectively stop said common frequency for the group, a broad band detector responsive to the receipt of any frequency signal irrespective of the number of frequencies said signal contains, and error-detecting means for detecting the receipt of a false signal containing only a single frequency or more frequencies than in a normal combination, said error detecting means comprising a relay having an operating winding thereof connected in an energizing circuit which includes contacts controlled by all the detectors, which contacts are interconnected to establish an operating condition for the relay when the broad band detector responds to a received signal accompanied by response of more or less than one of the frequency detectors.

References Cited in the file of this patent

UNITED STATES PATENTS

| | | |
|---|---|---|
| 2,173,154 | Bernard | Sept. 19, 1939 |
| 2,319,339 | Muller | May 18, 1943 |
| 2,542,592 | Styren | Feb. 20, 1951 |
| 2,794,156 | Mohler | May 28, 1957 |
| 2,935,572 | Hastings | May 3, 1960 |